United States Patent
Unoki et al.

(10) Patent No.: US 12,046,257 B1
(45) Date of Patent: Jul. 23, 2024

(54) REDUCING PEAK POWER CONSUMPTION IN A MULTI-ACTUATOR HARD DISK DRIVE

(71) Applicant: Western Digital Technologies, Inc., San Jose, CA (US)

(72) Inventors: Toshiroh Unoki, Fujisawa (JP); Ryoji Fukuhisa, Suginami (JP); Hisatoshi Iwata, Yamato (JP); Jun Yoshida, Fujisawa (JP)

(73) Assignee: Western Digital Technologies, Inc., San Jose, CA (US)

( * ) Notice: Subject to any disclaimer, the term of this patent is extended or adjusted under 35 U.S.C. 154(b) by 0 days.

(21) Appl. No.: 18/225,092

(22) Filed: Jul. 21, 2023

Related U.S. Application Data

(60) Provisional application No. 63/457,361, filed on Apr. 5, 2023.

(51) Int. Cl.
G11B 19/28 (2006.01)
G06F 1/3234 (2019.01)

(52) U.S. Cl.
CPC ............ G11B 19/28 (2013.01); G06F 1/3268 (2013.01)

(58) Field of Classification Search
None
See application file for complete search history.

(56) References Cited

U.S. PATENT DOCUMENTS

| | | | |
|---|---|---|---|
| 5,471,353 A | 11/1995 | Codilian et al. | |
| 6,628,469 B1* | 9/2003 | Hoyt | G11B 19/02 |
| 6,819,513 B2 | 11/2004 | Chainer et al. | |
| 7,490,261 B2 | 2/2009 | Gaertner et al. | |
| 8,736,993 B2* | 5/2014 | Bandic | G06F 3/0613 360/48 |
| 9,971,515 B2 | 5/2018 | Chang et al. | |
| 10,013,280 B2* | 7/2018 | Hsu-Hung | G06F 9/4843 |
| 10,482,911 B1* | 11/2019 | Nanjunda Swamy | G06F 11/2087 |
| 10,545,810 B2* | 1/2020 | Barndt | G06F 11/106 |
| 10,802,739 B1* | 10/2020 | Weber | G06F 3/061 |
| 11,062,734 B1 | 7/2021 | Brand | |
| 11,221,765 B2* | 1/2022 | Kataria | G06N 3/08 |
| 11,379,150 B2* | 7/2022 | Bent | G06F 3/0689 |
| 11,437,071 B2* | 9/2022 | Tang Kok Meng | G06F 3/0604 |

(Continued)

FOREIGN PATENT DOCUMENTS

CN 106484318 B 7/2021

OTHER PUBLICATIONS

Seagate, Cheetah 15K.5 SCSI, Publication No. 100384776, Rev. C, Oct. 2006, 94 pages, Seagate Technology LLC, downloaded at https://www.seagate.com/staticfiles/support/disc/manuals/enterprise/cheetah/15K.5/SCSI/100384776c.pdf.

(Continued)

*Primary Examiner* — Fred Tzeng
(74) *Attorney, Agent, or Firm* — John D. Henkhaus

(57) ABSTRACT

An exclusive operation approach, in the context of background activity processes among multiple LUNs corresponding to a multi-actuator hard disk drive, can avoid related power peaks by controlling background operations so that they are not permitted to run concurrently across different LUNs. Managing the progress of one or more background activities such as background media scan (BMS) for each LUN, including aligning the progress of the background activity among multiple LUNs, can reduce power consumption of a multi-actuator drive.

18 Claims, 7 Drawing Sheets

(56) References Cited

U.S. PATENT DOCUMENTS

| | | | |
|---|---|---|---|
| 11,456,009 B1* | 9/2022 | Liu | G11B 5/4813 |
| 11,881,232 B2* | 1/2024 | Han | G06F 1/3221 |
| 2009/0083580 A1* | 3/2009 | Postage | G06F 11/2221 |
| | | | 714/34 |
| 2018/0074701 A1* | 3/2018 | Chang | G06F 3/0688 |
| 2021/0124641 A1* | 4/2021 | Caldwell, Jr. | G06F 3/0665 |
| 2022/0406333 A1* | 12/2022 | Keshavan | G11B 5/4813 |
| 2023/0267076 A1* | 8/2023 | Hall | G06F 3/0676 |
| | | | 711/4 |

OTHER PUBLICATIONS

Seagate, Mach 2 Technology Paper, pp. 1-11, copyright 2020 Seagate Technology LLC, downloaded at https://www.seagate.com/files/www-content/solutions/mach-2-multi-actuator-hard-drive/files/tp714-dot-2-2006us-mach-2-technology-paper.pdf.

* cited by examiner

REDUCING PEAK POWER CONSUMPTION IN A MULTI-ACTUATOR HARD DISK DRIVE

FIELD OF EMBODIMENTS

Embodiments of the invention may relate generally to data storage devices such as hard disk drives and particularly to approaches for reducing peak power consumption in a multi-actuator hard disk drive.

BACKGROUND

A hard disk drive (HDD) is a non-volatile storage device that is housed in a protective enclosure and stores digitally encoded data on one or more circular disks having magnetic surfaces. When an HDD is in operation, each magnetic-recording disk is rapidly rotated by a spindle system. Data is read from and written to a magnetic-recording disk using a read-write transducer (or read-write "head") that is positioned over a specific location of a disk by an actuator. A read-write head makes use of magnetic fields to write data to, and read data from, the surface of a magnetic-recording disk. A write head works by using the current flowing through its coil to produce a magnetic field. Electrical pulses are sent to the write head, with different patterns of positive and negative currents. The current in the coil of the write head produces a localized magnetic field across the gap between the head and the magnetic disk, which in turn magnetizes a small area on the recording medium.

Increasing areal density (a measure of the quantity of information bits that can be stored on a given area of disk surface) is one of the on-going goals of hard disk drive technology evolution. In recent years the growth in areal density in HDDs has not kept pace with the trends of years past. This has shifted the burden on the mechanics to boost capacity increases by increasing the number of disks within the prescribed form factor. In one form, this goal manifests in the type of high-capacity HDDs that are especially attractive in the context of enterprise, cloud computing/storage, and data center environments. However, the performance of high-capacity HDDs has not necessarily scaled up commensurately with the increases in capacity. The high latencies of large capacity HDDs in a clustered environment, such as in data centers with multiple clustered nodes, limits their appeal due to slower access to stored data. As these HDDs are primarily used for near line storage in data centers in hyper-scale environments, the performance of these high-capacity drives also has to satisfy the IOPs (Input/Output Operations Per Second) density requirements (in some instances, similarly referred to as IOPs/TB) to minimize latency.

One approach to increasing high-capacity HDD performance is the implementation of multi-actuator systems, in which multiple independently operating actuators are assembled onto a single shared pivot shaft in order to independently and concurrently read from and/or write to multiple recording disks of a disk stack. For the host system to readily use this feature, multi-LUN technology is typically employed to define multiple LUNs (Logical Units, or logical unit number) in one HDD and issue commands for each LUN, where each LUN typically logically maps to the physical memory serviced by a respective actuator. However, one of the challenges with multi-actuator HDDs is the increase in power consumption. For example, except for what may serve as common parts, such as the disk spindle motor, the power consumption of a multi-actuator HDD is roughly multiplied by the number of LUNs during media access operations, and customers in this space are commonly highly sensitive to power consumption.

Any approaches that may be described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

Embodiments are illustrated by way of example, and not by way of limitation, in the figures of the accompanying drawings and in which like reference numerals refer to similar elements and in which.

SUMMARY OF EMBODIMENT(S)

Figure 1:
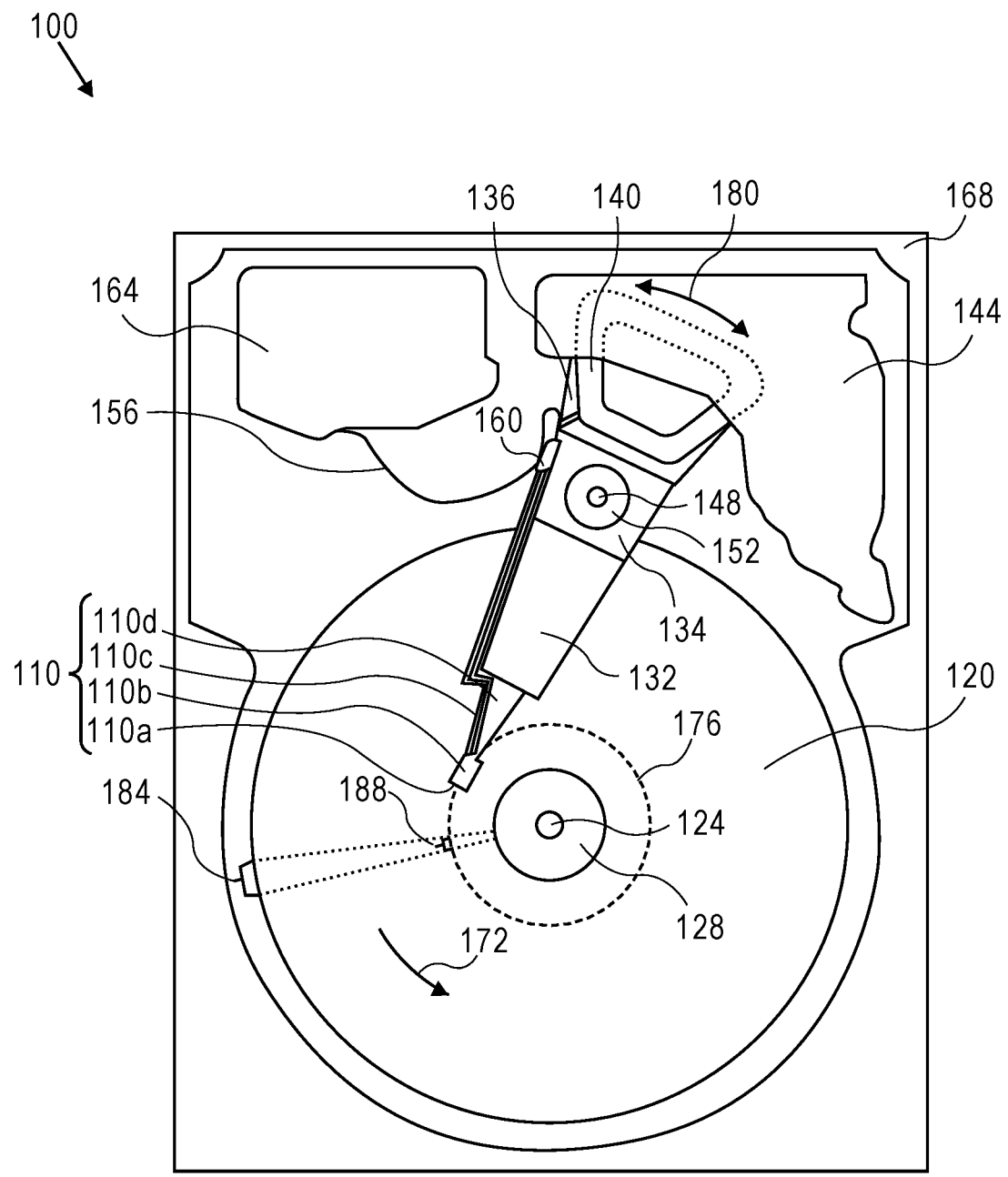
FIG. 1 is a plan view illustrating a hard disk drive (HDD), according to an embodiment.

Controller circuitry for a multi-actuator hard disk drive, storing or accessing one or more sequences of instructions which, when executed by one or more processors, cause performance of (i) receiving, in association with a first logical unit of memory of the multi-actuator hard disk drive, a first request to start a repeating background process corresponding to the first logical unit of memory, (ii) responsive to the first request, permitting the start of the background process corresponding to the first logical unit of memory, (iii) receiving, in association with a second logical unit of memory of the multi-actuator hard disk drive, a second request to start the repeating background process corresponding to the second logical unit of memory, and (iv) responsive to the second request, permitting the start of the background process corresponding to the second logical unit of memory in response to determining the background process corresponding to the first logical unit of memory is complete or not permitting the start of the background process corresponding to the second logical unit of memory in response to determining the background process corresponding to the first logical unit of memory is not complete.

DETAILED DESCRIPTION

Generally, approaches to reducing peak power consumption in a multi-actuator hard disk drive are described. In the following description, for the purposes of explanation, numerous specific details are set forth in order to provide a thorough understanding of the embodiments of the invention described herein. It will be apparent, however, that the embodiments of the invention described herein may be practiced without these specific details. In other instances, well-known structures and devices may be shown in block diagram form in order to avoid unnecessarily obscuring the embodiments of the invention described herein.

INTRODUCTION

Terminology

References herein to "an embodiment", "one embodiment", and the like, are intended to mean that the particular feature, structure, or characteristic being described is included in at least one embodiment of the invention. However, instances of such phrases do not necessarily all refer to the same embodiment, The term "substantially" will be understood to describe a feature that is largely or nearly structured, configured, dimensioned, etc., but with which manufacturing tolerances and the like may in practice result in a situation in which the structure, configuration, dimension, etc. is not always or necessarily precisely as stated. For example, describing a structure as "substantially vertical" would assign that term its plain meaning, such that the sidewall is vertical for all practical purposes but may not be precisely at 90 degrees throughout.

While terms such as "optimal", "optimize", "minimal", "minimize", "maximal", "maximize", and the like may not have certain values associated therewith, if such terms are used herein the intent is that one of ordinary skill in the art would understand such terms to include affecting a value, parameter, metric, and the like in a beneficial direction consistent with the totality of this disclosure. For example, describing a value of something as "minimal" does not require that the value actually be equal to some theoretical minimum (e.g., zero), but should be understood in a practical sense in that a corresponding goal would be to move the value in a beneficial direction toward a theoretical minimum.

Context

Recall the observation that the performance of high-capacity hard disk drives (HDDs) has not necessarily scaled up commensurately with increases in storage capacity, and the pressure to increase the performance (e.g., IOPS) by reducing the latencies for data operations of high-capacity HDDs has become even stronger as capacities of HDDs continue to increase. As mentioned, one possible approach to increasing HDD performance is the implementation of multi-actuator systems, in which multiple independently operating actuators are employed to concurrently read from and/or write to multiple recording disks of a disk stack. However, power consumption may be an adverse or limiting factor with respect to widespread implementation of multi-actuator HDDs.

Figure 2:
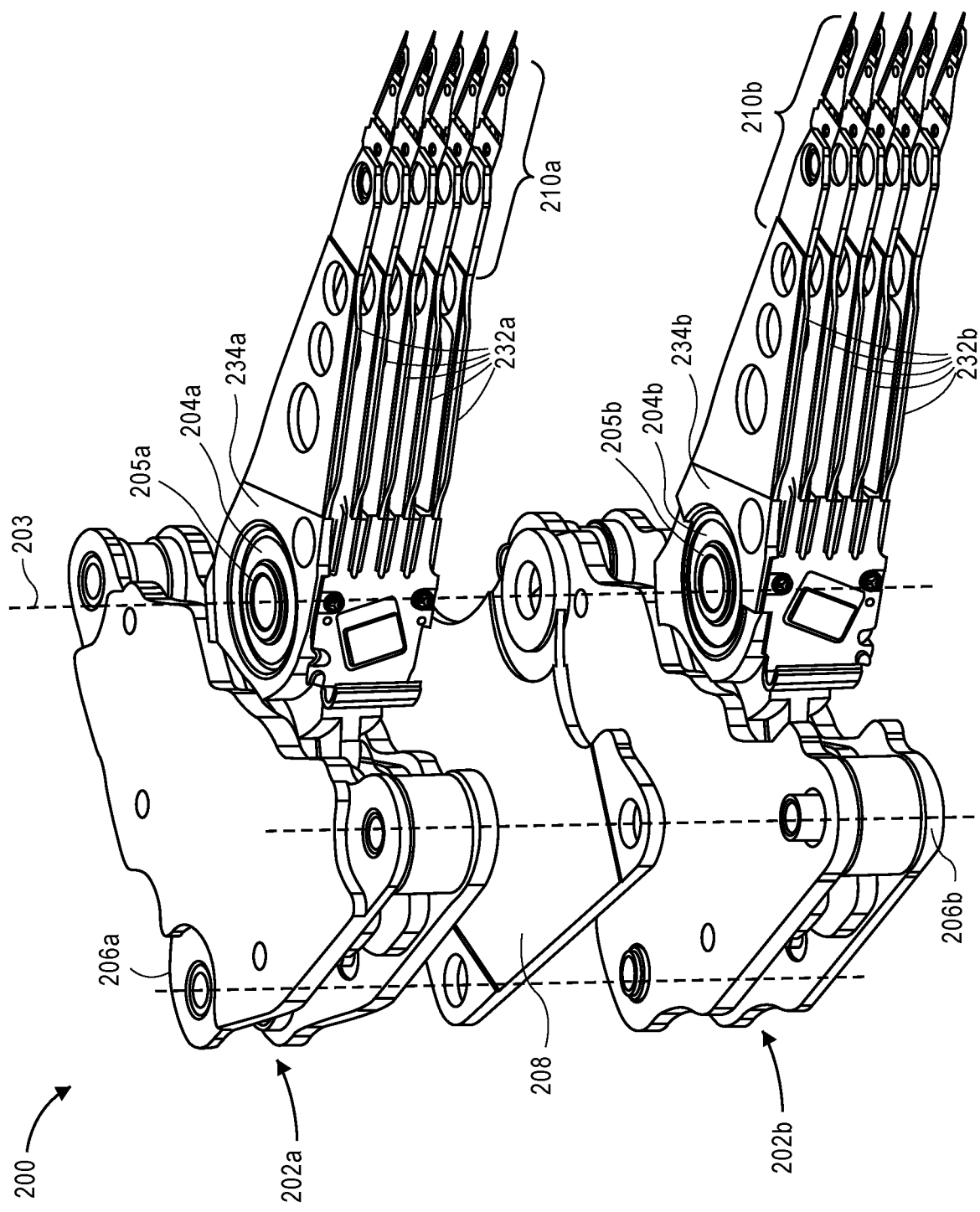
FIG. 2 is an exploded perspective view illustrating an example multi-actuator assembly, according to an embodiment.

FIG. 2 is an exploded perspective view illustrating an example multi-actuator assembly, according to an embodiment. Here, a hard disk drive comprises a multi-actuator assembly 200 comprising two (for purposes of a non-limiting example) independent actuator systems 202a, 202b which can be independently optimized, sharing the same rotational axis 203 and capable of concurrently servicing a respective disk stack (see, e.g., a stack of multiple recording media 120 of FIG. 1). Each of the two actuator systems 202a, 202b comprises its own respective pivot bearing assembly 204a, 204b (see, e.g., pivot bearing assembly 152 of FIG. 1), and actuator systems 202a, 202b are physically separate from each other. Thus, each actuator system 202a, 202b also comprises its own voice coil motor assembly (VCMA) 206a, 206b. The two actuator systems 202a, 202b are stacked on top of each other in a modular fashion, with each of the two pivot shafts 205a, 205b (see, e.g., pivot shaft 148 of FIG. 1) engaging a common post (not shown here) that is integrated with an enclosure base (e.g., HDD housing 168 of FIG. 1). Each actuator system 202a, 202b further comprises a respective voice coil (not visible here; see, e.g., voice coil 140 of FIG. 1), carriage 234a, 234b (see, e.g., carriage 134 of FIG. 1), set or comb of arms 232a, 232b (see, e.g., arm 132 of FIG. 1) coupled therewith, and a set of HGAs 210a, 210b (see, e.g., HGA 110 of FIG. 1) coupled therewith. Note that the number of actuators that may be incorporated into an HDD may vary from implementation to implementation, however, an exemplary but non-limiting dual-actuator arrangement is described throughout herein. Furthermore, a central support structure 208 may be sandwiched between the pivot shafts 205a, 205b and between the pole pieces of the upper and lower VCMAs 206a, 206b, to provide a structurally stiff interface between the actuator systems 202a, 202b to mitigate adverse effects of structural dynamics coupling between the actuator systems 202a, 202b.

Recall that for the host system to readily take advantage of the multi-actuator features, multi-LUN technology is typically employed to define multiple LUNs in a single multi-actuator HDD and to issue commands for each LUN, where each LUN typically maps to the physical memory serviced by a respective actuator system 202a, 202b. Note that a "LUN" as a "logical unit number" is technically an identifier of a logical unit of memory but is used here (and commonly and colloquially) to refer to the logical unit of memory itself. Recall further that the power consumption of a multi-actuator HDD is roughly multiplied by the number of LUNs during media access operations, however, HDD power consumption can be broadly divided into and associated with (i) executing host commands, and (ii) idle (i.e., not executing host commands). Like conventional HDDs, multi-actuator HDDs also perform numerous background activities, which are typically automatic and recurring, that are not directly associated with data read-write operations and are typically related to maintaining and ensuring data integrity as well as long-term HDD health. For example, one background activity typical of an HDD is a background media scan ("BMS"), which is a background process (ultimately affecting read/write channel parameters) by which the entirety of user sectors are scanned to provide error detection on the HDD media before such errors might disrupt normal read-write operations. While the duration of a single media access is not very substantial, the total number of media accesses is substantial because multiple accesses are made to all heads and, therefore, the peak power is likely to increase accordingly. While the techniques described herein may be implemented in the context of any of the various background processes typical or atypical of an HDD, the BMS background activity is referenced herein throughout for purposes of a non-limiting example.

Example Configuration for Dual-Actuator Hard Disk Drive

Figure 3:
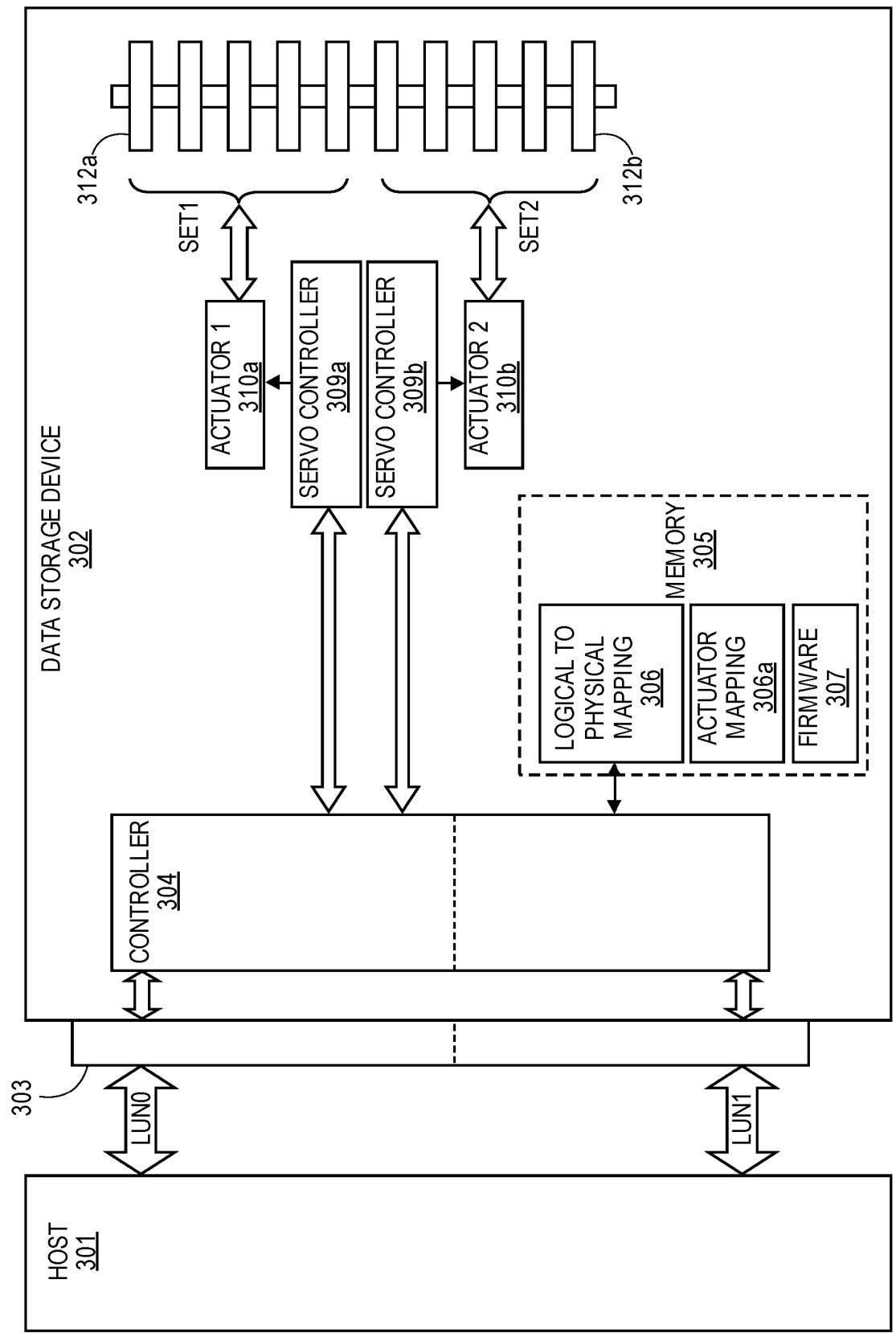
FIG. 3 is a block diagram illustrating a dual-actuator hard disk drive, according to an embodiment.

FIG. 3 is a block diagram illustrating a dual-actuator hard disk drive, according to an embodiment. FIG. 3 depicts an example Data Storage Device (DSD) 302 which communicates with a host 301, which may be embodied in a hardware machine on which executable code executes (for non-limiting examples, a computer or hardware server, and the like), or as software instructions executable by one or more processors (for non-limiting examples, a software server such as a database server, application server, media server, and the like). Host 301 generally represents a client of the DSD 302, and has the capability to make data read and write requests (input/output or "IO" operation requests) to the DSD 302. Host 301 and DSD 302 may form a system, such as a computer system (e.g., server, desktop, mobile/laptop, digital video recorder, and the like) or other electronic device. The components of FIG. 3 may or may not be physically co-located and therefore host 301 may be located remotely from DSD 302. Those of ordinary skill in the art will appreciate that embodiments can include more or fewer than those elements shown in FIG. 3 and that the disclosed processes can be implemented in other environments having different configurations, such as a different number of actuators for a non-limiting example.

DSD 302 includes non-volatile memory (NVM) in the form of rotating magnetic media, depicted here in the form of one or more disk stacks, i.e., disks 312a and disks 312b. Here, disks 312a (disk "set 1" of FIG. 3) are associated with and correspond to a first actuator 310a ("actuator 1" of FIG. 3) and disks 312b (disk "set 2" of FIG. 3) are associated with and correspond to a second actuator 310b ("actuator 2" of FIG. 3). Each actuator 310a, 310b assembly comprises one or more read-write transducers or heads (not visible here; see, e.g., read-write head 110a of FIG. 1) configured to provide concurrent access to each of the magnetic disks and disk sets, i.e., disks 312a, 312b. As such, the read-write heads coupled to the first actuator 310a access different surfaces of the recording media than the read-write heads coupled to the second actuator 310b, where each disk surface of disks 312a, 312b includes a number of radially spaced, concentric tracks for storing data. The number of magnetic recording disks operated upon by each of the actuators 310a, 310b (depicted here as ten (10) disks total) may vary from implementation to implementation. According to an embodiment, actuators 310a, 310b are configured to rotate independently of each other about one or more actuator pivots (not visible here, see, e.g., pivot shaft 148 of FIG. 1). In this regard, actuators 310a, 30b are in a split coaxial configuration that allows the heads on each actuator 310a, 30b to access areas of disks 312a, 312b that are not radially aligned with each other, where such rotational independence provides for an improvement in the performance in terms of IOPS of DSD 302 over DSDs with only a single actuator. Stated otherwise, the independent movement of actuators 310a, 310b can facilitate simultaneous reading and/or writing in different radial locations to perform more commands in a given amount of time.

As discussed, host 301 typically addresses each actuator 310a, 310b in a multi-actuator DSD such as depicted in FIG. 3 in terms of a corresponding LUN. For example, host 301 identifies with and is shown interacting with the first actuator 310a in terms of or in the context of a first LUN (e.g., depicted as LUN0) and with the second actuator 310b in terms of or in the context of a second LUN (e.g., depicted as LUN1). As such, host 301 would direct operational commands to the first actuator 310a by identifying and addressing such operations to LUN0 and would direct operational commands to the second actuator 310b by identifying and addressing such operations to LUN1. Likewise, host 301 would expect a response from the first actuator 310a from, i.e., in the context of or as corresponding to, LUN0 and would expect a response from the second actuator 310b from, i.e., in the context of or as corresponding to, LUN1.

Host 301 interacts with DSD 302 via an interface 303 (e.g., an IO interface) for transferring data to and from the DSD 302, such as via a bus or network such as Ethernet or WiFi or a bus standard such as Serial Advanced Technology Attachment (SATA), PCI express (PCIe), Small Computer System Interface (SCSI), or Serial Attached SCSI (SAS), for non-limiting examples. In operation, interface 303 receives host read and write commands from host 301 for reading data from and writing data to disk surfaces of disks 312a, 312b. Those of ordinary skill in the art will appreciate that an interface for a multi-actuator DSD, such as interface 303 of DSD 302, may be implemented as separate interfaces for each of the multiple actuators 310a, 310b, having respective interface ports, electronic circuitry, and the like.

DSD 302 includes an electronic controller 304, which includes circuitry such as one or more processors for executing instructions, and may be implemented as a System On a Chip (SoC) electronic circuitry, which may include a memory 305, a microcontroller, a Digital Signal Processor (DSP), an Application-Specific Integrated Circuit (ASIC), a Field Programmable Gate Array (FPGA), hard-wired logic, analog circuitry and/or a combination thereof, for non-limiting examples. Those of ordinary skill in the art will appreciate that interface 303 can be included as part of controller 304. Firmware 307, which may be stored in memory 305, includes computer-executable instructions for execution by controller 304 in operating DSD 302. Executable logic stored as one or more sequences of instructions, such as in the form of firmware 307, is configured to dictate how background activities and other operations may be carried out among the multiple actuators 310a, 310b. Controller 304 may include a read/write channel (not shown) configured to encode data corresponding to write commands and decode data corresponding to read commands. Here also, those of ordinary skill in the art will appreciate that a controller for a multi-actuator DSD, such as controller 304 of DSD 302 and/or the read/write channel particularly, may be implemented as separate electronic circuitry and/or logic instructions (i.e., different "channels", per se) for each of the multiple actuators 310a, 310b.

A controller such as controller 304 typically includes, or operates in conjunction with, one or more servo controllers 309a, 309b that transmit commands to each actuator 310a, 310b for accessing portions of disks 312a, 312b. Servo controllers 309a, 309b send VCM (voice coil motor) commands to respective VCMs (not visible here, see, e.g., VCM coil 140 of FIG. 1) to control movement of actuators 310a, 310b in positioning read-write heads in relation to the surfaces of disks 312a, 312b. More particularly, each surface of disks 312a, 312b can include servo wedges that can provide location information (e.g., a servo burst) that can be read from the disk surface by a read-write head to determine a position of the head. For data to be written on a disk surface, the read/write channel of controller 304 may encode buffered data into a write signal, which is provided to a head for magnetically writing data on a disk surface that has been assigned logical addresses for the data in the write command. In addition, controller 304 via servo controller 309a, 309b can provide VCM commands to VCMs of actuators 310a, 310b to position the head over a particular track for writing the data. Furthermore, in response to a read command for data stored on a disk surface of disks 312a, 312b, controller 304 via servo controller 309a, 309b positions a head over a particular track on a disk surface that has been assigned logical addresses for the data in the read command. Controller 304 controls the head to magnetically read data stored in the track, and to send the read data as a read signal to a read/write channel of controller 304. The read/write channel can then decode and buffer the data into memory 305 or another memory for transmission to host 301 via interface 303

The memory 305 of DSD 302 is further configured to store the firmware 307, a logical to physical mapping 306, and an actuator mapping 306a. In some implementations, memory 305 may be volatile memory such as Dynamic Random Access Memory (DRAM), with temporary copies of one or more of the firmware 307, the logical to physical mapping 306 and the actuator mapping 306a, which may be stored more permanently in a non-volatile memory (NVM), such as on disks 312a, 312b or in another NVM of DSD 302. In other implementations, memory 305 may be an NVM, such as a NAND flash memory, a Magnetoresistive Random Access Memory (MRAM) or other type of non-volatile solid-state memory. Logical to physical mapping 306 (generally, a data structure or collection of data values and the relationships among them) associates logical addresses of data with physical locations for storing the data on the disk surfaces of disks 312a, 312b. In some implementations, logical to physical mapping 306 may include a translation table that maps Logical Block Addresses (LBAs) of data to Physical Block Addresses (PBAs) indicating a location on a disk surface, such as a particular sector or range of sectors in a particular track on the disk surface or particular block(s) (e.g., of one or more sectors). The logical addresses in logical to physical mapping 306 can be expressed as address ranges, for example, and where a group of which is associated with a particular logical unit or LUN (see, e.g., LUN0 and LUN1 of FIG. 3). Additionally, logical to physical mapping 306 may include or may be associated with actuator mapping 306a (e.g., a data structure) that maps physical addresses on disks 312a, 312b to the actuator 310a, 310b that accesses the physical addresses, where the physical addresses may be represented in the actuator mapping 306a as ranges of physical addresses accessed by each actuator 310a, 310b. In some implementations, the actuator mapping 306a may be arranged based on head mapping information indicating which head accesses different physical addresses.

Exclusive Operation Across LUNs for Multi-Actuator Hard Disk Drive

Figure 4:
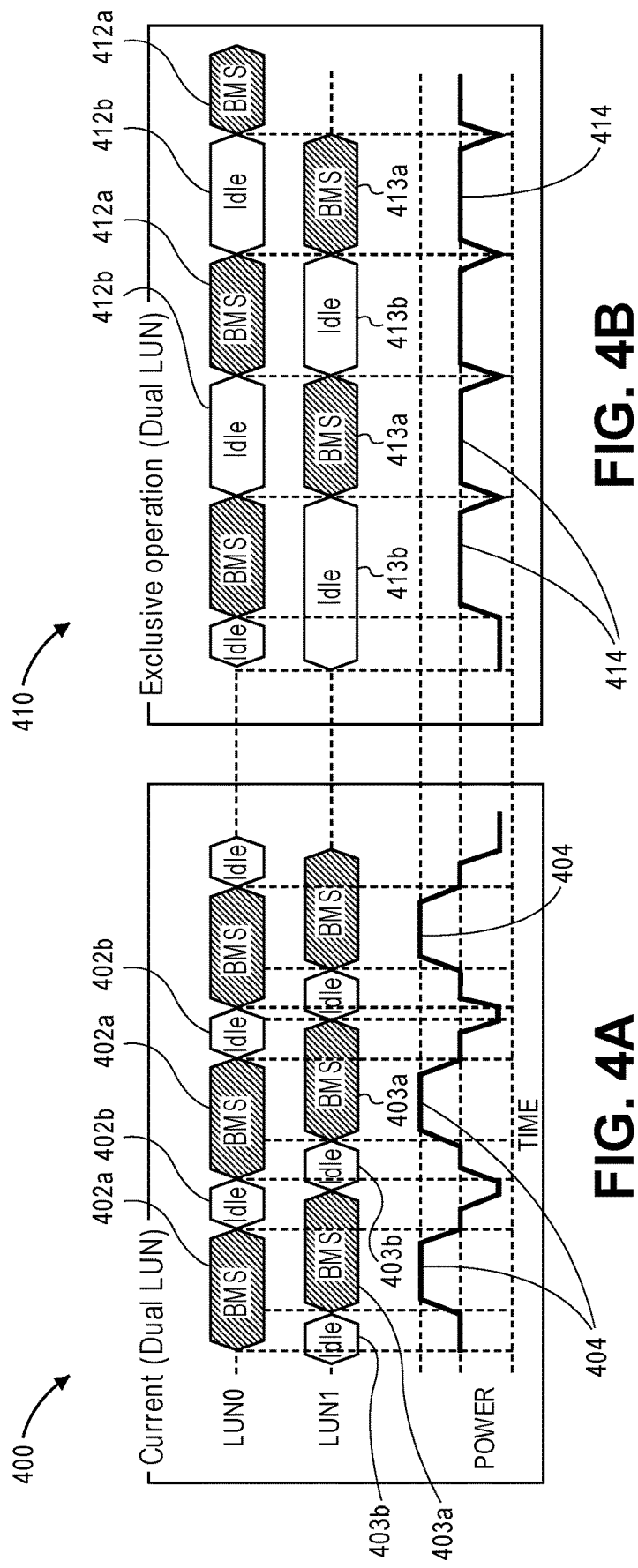
FIG. 4A is a diagram illustrating background power consumption in a dual-LUN HDD, according to an embodiment.
FIG. 4B is a diagram illustrating background power consumption in an exclusive operation dual-LUN HDD, according to an embodiment.

As discussed, the power consumption of a multi-actuator HDD is roughly multiplied by the number of LUNs during media access operations and, similarly, the power consumption of a multi-actuator HDD may be roughly multiplied by the number of LUNs during background activities or operations when such background activities are performed concurrently for all the LUNs. FIG. 4A is a diagram illustrating background power consumption in a dual-LUN HDD, according to an embodiment. Diagram 400 is presented in the context of cyclical (e.g., applied to one chunk or portion of physical memory at a time, preferably with idle time between) background BMS operations 402a, 403a, interspersed with idle times 402b, 403b, which may be running randomly and including concurrently at least at some times, for each of multiple LUNs labeled "LUN0" (e.g., BMS operation 402a, idle time 402b) and "LUN1" (e.g., BMS operation 403a, idle time 403b). Diagram 400 thus illustrates the presence of power peaks 404 in the illustrated total power consumption timeline corresponding to both LUNs, indicative of the times during which the BMS operations 402a, 403a are running concurrently for both LUN0 and LUN1.

However, power peaks such as power peaks 404 may be avoided based on the utilization of exclusivity of background operations, an approach or technique referred to herein as "exclusive operation", whereby background operations are controlled and managed such that they are not permitted to run concurrently across different LUNs. FIG. 4B is a diagram illustrating background power consumption in an exclusive operation dual-LUN HDD, according to an embodiment. Diagram 410 is presented in the context of cyclical background BMS operations 412a, 413a, interspersed with idle times 412b, 413b, running in a controlled manner such that at no times are background BMS operations 412a, 413a run concurrently among the multiple LUNs labeled "LUN0" (e.g., BMS operation 412a) and "LUN1" (e.g., BMS operation 413a). Diagram 410 thus illustrates the notably and significantly lower power peaks 414 in the illustrated power consumption timeline corresponding to both LUNs, as compared to power peaks 404 of diagram 400, indicative of controlling the BMS operations 412a, 413a in a manner prohibiting such background operations from running concurrently (i.e., rather, exclusive operations) for both LUN0 and LUN1. While this exclusive operation approach is illustrated and described in the context of managing execution of a single background procedure (i.e., BMS), as mentioned, the techniques described herein may be implemented in the context of any of the various background procedures typical or atypical of an HDD. Furthermore, it is contemplated that the exclusive operation approach may be applied across different background procedures, whereby multiple different background procedures are controlled and managed such that their corresponding operations are not permitted to run concurrently across different LUNs.

This exclusive operation approach to background activities in a multi-actuator HDD may be implemented by way of an (effectively) "internal host" within HDD electronic controller circuitry (e.g., implemented in firmware 307 with machine-executable logic or code, computer programming, executable sequences of instructions, etc. for non-limiting terminology examples), which is configured to manage the progress of one or more background activities, operations, processes (e.g., the BMS operation) for each LUN, including aligning or interleaving the progress of the background activity among the multiple LUNs such as LUN0 and LUN1 of FIG. 4B. Each LUN preferably performs or executes the respective background activity as is typical according to known techniques.

According to an embodiment, to effectuate managing and aligning the progress of background activities among multiple LUNs, the internal host is configured to control when a given LUN is allowed or permitted to begin execution of a corresponding background activity or at least a predetermined portion of a corresponding background activity. In the scenario of BMS operations, the predetermined portion of the BMS activity may correspond to one or more particular "chunk" or portion of physical memory, where according to an embodiment each LUN (e.g., executable programming code associated with or corresponding to, or configured to manage and control, a given LUN) is required to inquire to or request from the internal host the permission to begin BMS activity on each particular chunk of memory, e.g., request independently and sequentially such as one chunk at a time. Consequently, the given LUN is configured to only perform the requested activity when explicitly permitted by the internal host. According to an embodiment, to further effectuate managing and aligning the progress of background activities among multiple LUNs, the internal host is configured to monitor the status of the background activities of each LUN. According to an embodiment, monitoring the status of a background activity of each LUN includes receiving a notification from or in association with each LUN (e.g., executable programming code associated with or corresponding to, or configured to manage and control, a given LUN), that the background activity corresponding to a given LUN (e.g., the scanning of a certain chunk of memory) is complete. Likewise, monitoring the status of a background activity of each LUN includes each LUN providing to the internal host such a notification that the background activity is complete.

Figure 5:
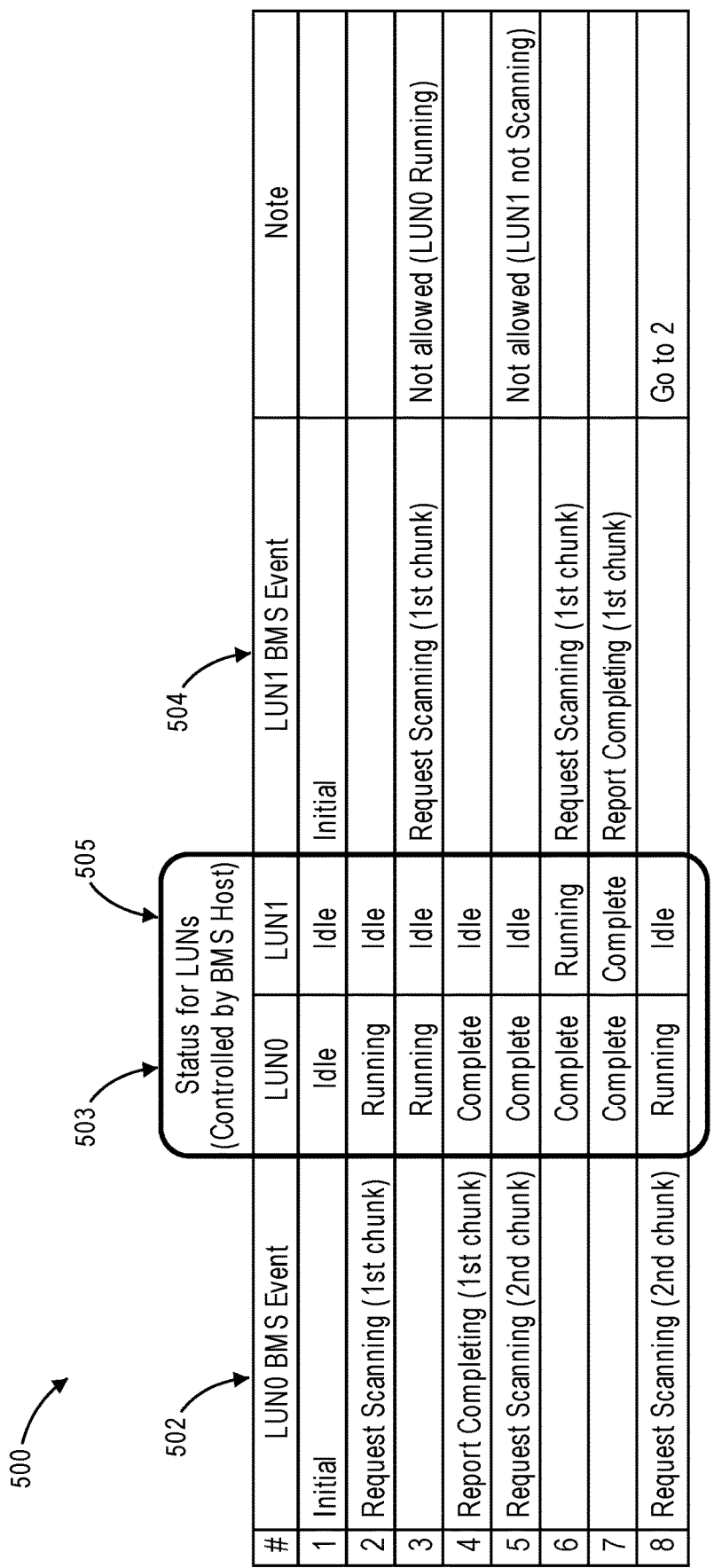
FIG. 5 is a table illustrating an example use case in an exclusive operation dual-LUN HDD, according to an embodiment.

FIG. 5 is a table illustrating an example use case in an exclusive operation dual-LUN HDD, according to an embodiment. Column 502 of table 500 lists events (e.g., BMS events) corresponding to LUN0 and similarly column 504 lists events (e.g., BMS events) corresponding to LUN1. Here, each LUN can perform one of two events: Request Scanning (e.g., request scan of one chunk/portion of memory of predetermined fixed size), and Completed (e.g., report completion of one chunk/portion scan). Column 503 lists the status of LUN0 based on the corresponding events of column 502, and column 505 lists the status of LUN1 based on the corresponding events of column 504. According to an embodiment, each LUN can be in one of three possible states: Idle (i.e., waiting to scan), Running (i.e., scan in progress), and Complete (i.e., scan complete for one chunk/portion of memory of predetermined fixed size).

At row 1, initially both LUN0 and LUN1 are in an Idle state.

At row 2, LUN0 performs or submits a Request Scanning event for a first chunk of memory, which is granted or allowed by the aforementioned "internal host" of controller 304 (FIG. 3), which moves LUN0 to a Running state while LUN1 remains in Idle state.

At row 3, LUN1 submits a Request Scanning event for a first chunk of memory, which is not granted or allowed by the internal host because LUN0 is still in Running state, so LUN0 remains Running while LUN1 remains Idle.

At row 4, LUN0 reports a Complete event for the first chunk, which moves LUN0 to a Complete state while LUN1 remains Idle at the moment.

At row 5, LUN0 submits a Request Scanning event for a second chunk of memory, which is not granted or allowed by the internal host because LUN1 is not yet scanning, leaving LUN0 in a Complete state while LUN1 remains Idle at the moment.

At row 6, LUN1 again submits a Request Scanning event for a first chunk of memory, which is granted or allowed by the internal host, which moves LUN1 to a Running state while LUN0 remains Complete.

At row 7, LUN1 reports a Complete event for the first chunk, which moves LUN1 to a Complete state while LUN0 remains Complete.

At row 8, LUN0 again submits a Request Scanning event for the second chunk of memory, which is granted or allowed by the internal host because LUN1 reported Complete at row 7, thereby moving LUN0 to a Running state while LUN1 moves to Idle. Here, the process effectively returns to row 2 with respect to the LUN0 status column 503 and the LUN1 status column 505, and the BMS background process can continue according to this exclusive operation approach.

Figure 6:
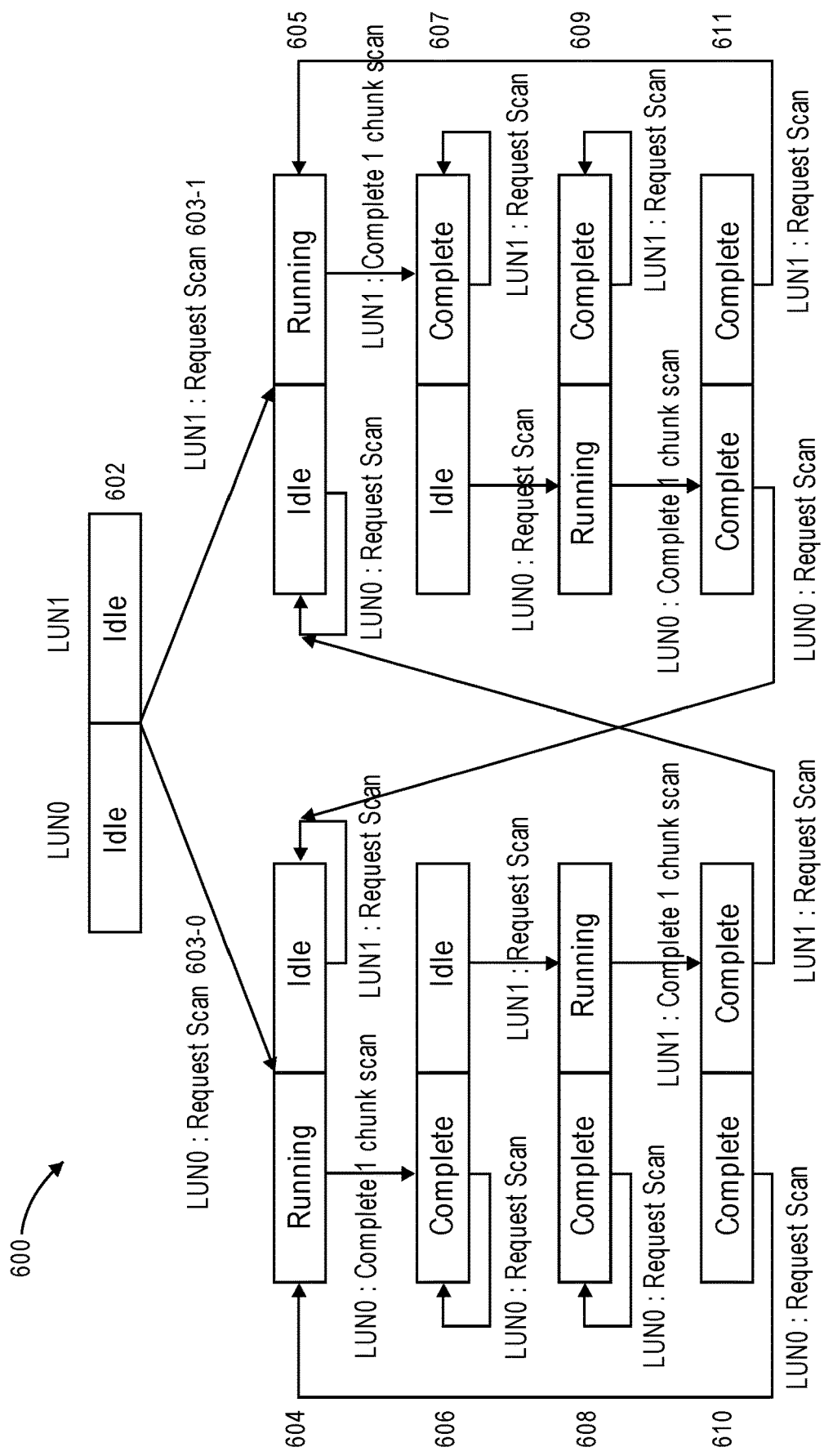
FIG. 6 is a diagram illustrating LUN state transition in an exclusive operation dual-LUN HDD, according to an embodiment.

FIG. 6 is a diagram illustrating LUN state transition in an exclusive operation dual-LUN HDD, according to an embodiment. State diagram 600 represents the state transitions of LUN0 and LUN1, consistent with the use case example depicted in table 500 of FIG. 5. As such, both LUN0 and LUN1 are first depicted Idle at state 602, consistent with row 1 of table 500.

In response to LUN0 Request Scanning of a chunk at line 603-0, at state 604 LUN0 is depicted in a Running state while LUN1 remains in Idle state, consistent with row 2 of table 500. If LUN1 submits a Request Scanning, LUN1 state remains Idle while LUN0 is Running.

In response to LUN0 reporting a Complete event for the chunk, at state 606 LUN0 is depicted in a Complete state while LUN1 remains in Idle state, consistent with row 4 of table 500. If LUN0 submits another Request Scanning, LUN0 state remains Complete until LUN0 is granted a Request Scanning.

In response to LUN1 submitting a Request Scanning for a chunk, because LUN0 is in a Complete state the LUN1 request is granted and at state 608 LUN1 moves to a Running state while LUN0 remains Complete, consistent with row 6 of table 500. If LUN0 submits a Request Scanning, LUN0 state remains Idle while LUN1 is Running.

In response to LUN1 reporting a Complete event for the chunk, at state 610 LUN0 is depicted in a Complete state while LUN1 is also depicted in a Complete state, consistent with row 7 of table 500. In response to LUN0 submitting another Request Scanning, the state diagram may return to state 604 with LUN0 depicted in a Running state while LUN1 is depicted in an Idle state.

In response to LUN1 submitting another Request Scanning, the state diagram may move to state 605 with LUN1 depicted in a Running state while LUN0 is depicted in an Idle state. State 605 may also be reached in response to an initial LUN1 Request Scanning of a chunk at line 603-1, such as if LUN1 submits an initial Request Scanning prior to LUN0. Here, if LUN0 submits another Request Scanning, LUN0 state remains Idle until LUN1 reports Complete.

The right side of state diagram 600 may be envisioned as a mirror of the left side of state diagram 600, whereby the respective state boxes are mirrored while the LUNs are switched. As such, in response to LUN1 reporting a Complete event for the chunk, at state 607 LUN1 is depicted in a Complete state while LUN0 remains in Idle state. Here, if LUN1 submits another Request Scanning, LUN1 state remains Complete until its turn to scan comes up again.

In response to LUN0 submitting a Request Scanning for a chunk, because LUN1 is in a Complete state the LUN0 request is granted and at state 609 LUN0 moves to a Running state while LUN1 remains Complete. Here, if LUN1 submits a Request Scanning, LUN1 state remains Complete while LUN0 is Running, i.e., the request is not yet granted.

In response to LUN0 reporting a Complete event for the chunk, at state 611 both LUN0 and LUN1 are depicted in a Complete state. In response to LUN1 submitting another Request Scanning, the state diagram may return to state 605 with LUN1 depicted in a Running state while LUN0 is depicted in Idle state. In response to LUN0 submitting another Request Scanning, the state diagram may move to state 604 with LUN0 depicted in a Running state while LUN1 is depicted in Idle state.

Controlling a Multi-Actuator Assembly in a Hard Disk Drive

Processing, functions, procedures, actions, method steps, and the like, that are described herein may include enactment by execution of one or more sequences of one or more instructions stored in one or more memory units and which, when executed by one or more processors, cause such performance. For example, controllers referenced herein (e.g., controller 304 of FIG. 3) and embodied in any form of and/or combination of software, hardware, and firmware, such as an application-specific integrated circuit (ASIC) comprising at least one memory unit for storing such instructions and at least one processor for executing such instructions, may be configured and implemented for such execution of instructions.

Figure 7:
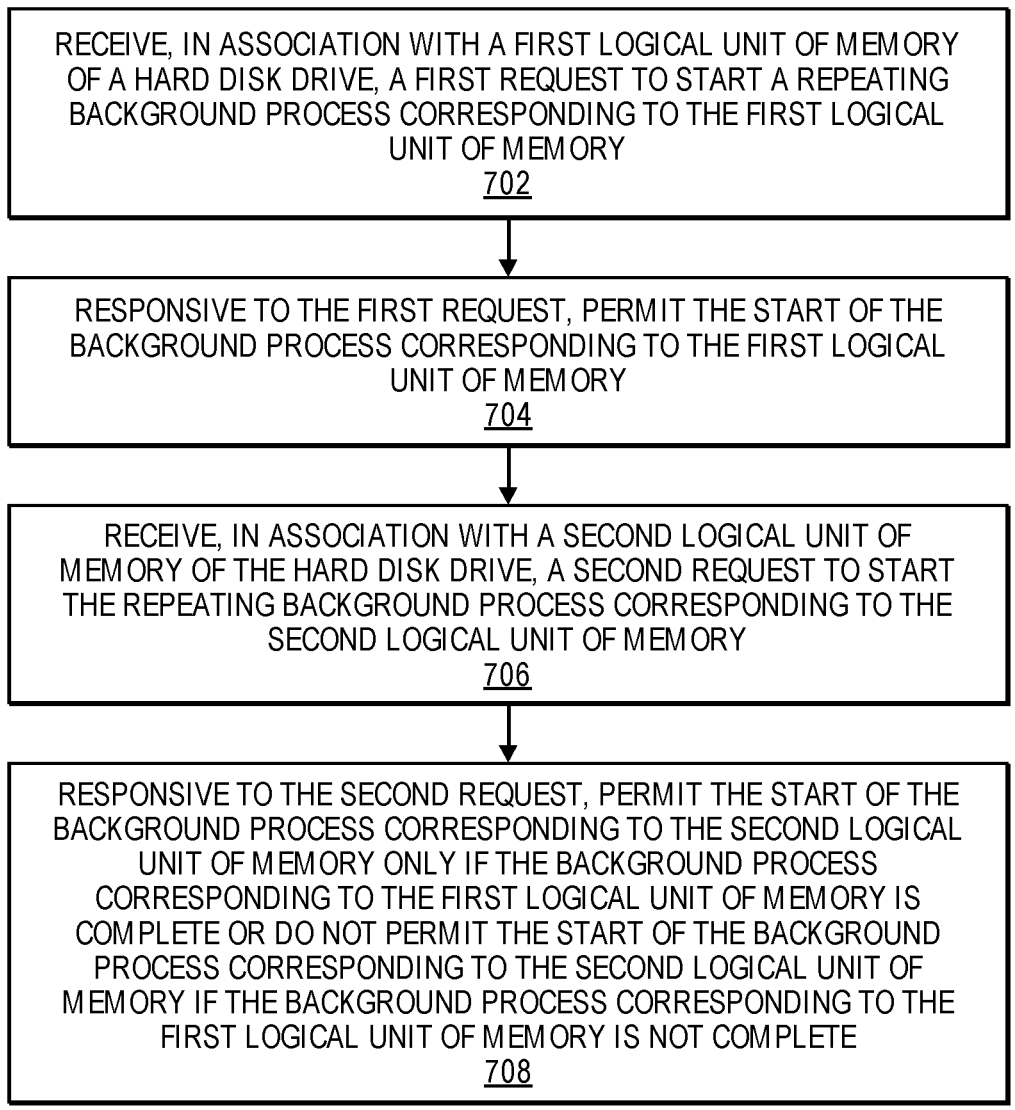
FIG. 7 is a flowchart illustrating a method of controlling an HDD multi-actuator system, according to an embodiment.

FIG. 7 is a flowchart illustrating a method of controlling an HDD multi-actuator system, according to an embodiment. Here, the hard disk drive comprises a multi-actuator system (see, e.g., FIGS. 2-3) comprising a first actuator assembly (e.g., actuator system 202a of FIG. 2; actuator 310a of FIG. 3, also referred to as "actuator 1") configured to operate on a corresponding first set of disk media surfaces (e.g., disks 312a of FIG. 3, also referred to as disk "set 1") and a second actuator assembly (e.g., actuator system 202b of FIG. 2; actuator 310b of FIG. 3, also referred to as "actuator 2") configured to operate on a corresponding second set of disk media surfaces (e.g., disks 312b of FIG. 3, also referred to as disk "set 2").

At block 702, receive, in association with a first logical unit of memory of the HDD, a first request to start a repeating background process corresponding to the first logical unit of memory. For example, an "internal host" of controller 304 (FIG. 3) receives a first request from (i.e., in association with) LUN0 of multi-actuator HDD (see, e.g., DSD 302 of FIG. 3) to start a BMS (background media scan) process corresponding to a first physical memory chunk corresponding to LUN0, such as scanning a portion of the first set of disk media surfaces corresponding to LUN0 and actuator 1. See, e.g., row 2 of table 500 (FIG. 5), line 603-0 of state diagram 600 (FIG. 6). Such a request may be received from an external host such as host 301 (FIG. 3), or may be received internally from within controller 304 or otherwise within DSD 302, for non-limiting examples.

At block 704, responsive to the first request, permit the start of the background process corresponding to the first logical unit of memory. For example, responsive to the request at block 702, the internal host of controller 304 permits, grants, allows the start of the BMS process corresponding to the first memory chunk corresponding to LUN0.

At block 706, receive, in association with a second logical unit of memory of the HDD, a second request to start the repeating background process corresponding to the second logical unit of memory. For example, the internal host of controller 304 (FIG. 3) receives a second request from (i.e., in association with) LUN1 of multi-actuator HDD (see, e.g., DSD 302 of FIG. 3) to start a BMS process corresponding to a physical memory chunk corresponding to LUN1 such as scanning a portion of the second set of disk media surfaces corresponding to LUN1 and actuator 2. See, e.g., rows 3, 6 of table 500, line 603-1 of state diagram 600. Again, such a request may be received from an external host such as host 301, or may be received internally from within controller 304 or otherwise within DSD 302, for non-limiting examples.

At block 708, responsive to the second request, permit the start of the background process corresponding to the second logical unit of memory only in response to determining the background process corresponding to the first logical unit of memory is complete, or do not permit the start of the background process corresponding to the second logical unit of memory in response to determining the background process corresponding to the first logical unit of memory is not complete. For example, responsive to determining that LUN0 has reported the completion of scanning its first chunk (see, e.g., row 4 of table 500) and therefore is in a Complete state (see, e.g., state 606 of state diagram 600), then the second request is responsively permitted, granted, allowed. However and by contrast, responsive to determining that LUN0 has not reported the completion of scanning its first chunk (see, e.g., row 3 of table 500) and therefore is still in a Running state (see, e.g., state 604 of state diagram 600), then the second request is responsively not permitted or granted or allowed.

According to an embodiment, the controller 304 is further configured to receive, in association with the first logical unit of memory, a notification that the background process corresponding to the first logical unit of memory is complete. For example, the internal host of controller 304 is configured and enabled to receive from or in association with LUN0 (and similarly from or in association with LUN1) a Complete event for the first chunk (see, e.g., row 4 of table 500) and therefore recognize or move LUN0 to a Complete state. Likewise, a background process manager or the like from within controller 304 or otherwise within DSD 302 is configured and enabled to report such a Complete event from or in association with LUN0 (and similarly from or in association with LUN1). Thus, the controller 304 is further configured to determine the status of the background process corresponding to the first logical unit of memory prior to responding to the second request at block 708, and either permitting or prohibiting the second request based on the state of the background process corresponding to the first logical unit.

Use of an exclusive operation paradigm in the context of background activity processes among multiple LUNs corresponding to a multi-actuator hard disk drive can avoid related power peaks (see, e.g., power peaks 404 of FIG. 4A) based on the exclusivity of background operations, whereby background operations are controlled and managed so that they are not permitted to run concurrently across different LUNs. That is, managing the progress of one or more background activities, operations, processes (e.g., the BMS operation) for each LUN, including aligning or interleaving the progress of the background activity among multiple LUNs, can reduce power consumption of a multi-actuator HDD.

Physical Description of an Illustrative Operating Context

Embodiments may be used in the context of a digital data storage device (DSD) such as a hard disk drive (HDD). Thus, in accordance with an embodiment, a plan view illustrating a conventional HDD 100 is shown in FIG. 1 to aid in describing how a conventional HDD and likewise a multi-actuator HDD typically operates.

FIG. 1 illustrates the functional arrangement of components of the HDD 100 including a slider 110b that includes a magnetic read-write head 110a. Collectively, slider 110b and head 110a may be referred to as a head slider. The HDD 100 includes at least one head gimbal assembly (HGA) 110 including the head slider, a lead suspension 110c attached to the head slider typically via a flexure, and a load beam 110d attached to the lead suspension 110c. The HDD 100 also includes at least one recording medium 120, but commonly multiple recording media 120, rotatably mounted on a spindle 124 and a drive motor (not visible) attached to the spindle 124 for rotating the medium 120. The read-write head 110a, which may also be referred to as a transducer, includes a write element and a read element for respectively writing and reading information stored on the medium 120 of the HDD 100. The medium 120 or a plurality of disk media may be affixed to the spindle 124 with a disk clamp 128.

The HDD 100 further includes an arm 132 attached to the HGA 110, a carriage 134, a voice-coil motor (VCM) that includes an armature 136 including a voice coil 140 attached to the carriage 134 and a stator 144 including a voice-coil magnet (not visible). The armature 136 of the VCM is attached to the carriage 134 and is configured to move the arm 132 and the HGA 110 to access portions of the medium 120, all collectively mounted on a pivot shaft 148 with an interposed pivot bearing assembly 152. In the case of an HDD having multiple disks, the carriage 134 may be referred to as an "E-block," or comb, because the carriage is arranged to carry a ganged array of arms that gives it the appearance of a comb.

An assembly comprising a head gimbal assembly (e.g., HGA 110) including a flexure to which the head slider is coupled, an actuator arm (e.g., arm 132) and/or load beam to which the flexure is coupled, and an actuator (e.g., the VCM) to which the actuator arm is coupled, may be collectively referred to as a head-stack assembly (HSA). An HSA may, however, include more or fewer components than those described. For example, an HSA may refer to an assembly that further includes electrical interconnection components. Generally, an HSA is the assembly configured to move the head slider to access portions of the medium 120 for read and write operations. The HSA is configured to mechanically interact with a load/unload (LUL) ramp 190 to move the head stack assembly (HSA), including the read-write head sliders, away from and off the disks and to safely position them onto the supporting structure of the LUL ramp.

With further reference to FIG. 1, electrical signals (e.g., current to the voice coil 140 of the VCM) comprising a write signal to and a read signal from the head 110a, are transmitted by a flexible cable assembly (FCA) 156 (or "flex cable", or "flexible printed circuit" (FPC)). Interconnection between the flex cable 156 and the head 110a may include an arm-electronics (AE) module 160, which may have an on-board pre-amplifier for the read signal, as well as other read-channel and write-channel electronic components. The AE module 160 may be attached to the carriage 134 as shown. The flex cable 156 may be coupled to an electrical-connector block 164, which provides electrical communication, in some configurations, through an electrical feed-through provided by an HDD housing 168. The HDD housing 168 (or "enclosure base" or "baseplate" or simply "base"), in conjunction with an HDD cover, provides a semi-sealed (or hermetically sealed, in some configurations) protective enclosure for the information storage components of the HDD 100.

Other electronic components, including a disk controller and servo electronics including a digital-signal processor (DSP), provide electrical signals to the drive motor, the voice coil 140 of the VCM and the head 110a of the HGA 110. The electrical signal provided to the drive motor enables the drive motor to spin providing a torque to the spindle 124 which is in turn transmitted to the medium 120 that is affixed to the spindle 124. As a result, the medium 120 spins in a direction 172. The spinning medium 120 creates a cushion of air that acts as an air-bearing on which the air-bearing surface (ABS) of the slider 110b rides so that the slider 110b flies above the surface of the medium 120 without making contact with a thin magnetic-recording layer in which information is recorded. Similarly in an HDD in which a lighter-than-air gas is utilized, such as helium for a non-limiting example, the spinning medium 120 creates a cushion of gas that acts as a gas or fluid bearing on which the slider 110b rides.

The electrical signal provided to the voice coil 140 of the VCM enables the head 110a of the HGA 110 to access a track 176 on which information is recorded. Thus, the armature 136 of the VCM swings through an arc 180, which enables the head 110a of the HGA 110 to access various tracks on the medium 120. Information is stored on the medium 120 in a plurality of radially nested tracks arranged in sectors on the medium 120, such as sector 184. Correspondingly, each track is composed of a plurality of sectored track portions (or "track sector") such as sectored track portion 188. Each sectored track portion 188 may include recorded information, and a header containing error correction code information and a servo-burst-signal pattern, such as an ABCD-servo-burst-signal pattern, which is information that identifies the track 176. In accessing the track 176, the read element of the head 110a of the HGA 110 reads the servo-burst-signal pattern, which provides a position-error-signal (PES) to the servo electronics, which controls the electrical signal provided to the voice coil 140 of the VCM, thereby enabling the head 110a to follow the track 176. Upon finding the track 176 and identifying a particular sectored track portion 188, the head 110a either reads information from the track 176 or writes information to the track 176 depending on instructions received by the disk controller from an external agent, for example, a microprocessor of a computer system.

An HDD's electronic architecture comprises numerous electronic components for performing their respective functions for operation of an HDD, such as a hard disk controller ("HDC"), an interface controller, an arm electronics module, a data channel, a motor driver, a servo processor, buffer memory, etc. Two or more of such components may be combined on a single integrated circuit board referred to as a "system on a chip" ("SOC"). Several, if not all, of such electronic components are typically arranged on a printed circuit board that is coupled to the bottom side of an HDD, such as to HDD housing 168.

References herein to a hard disk drive, such as HDD 100 illustrated and described in reference to FIG. 1, may encompass an information storage device that is at times referred to as a "hybrid drive". A hybrid drive refers generally to a storage device having functionality of both a traditional HDD (see, e.g., HDD 100) combined with solid-state storage device (SSD) using non-volatile memory, such as flash or other solid-state (e.g., integrated circuits) memory, which is electrically erasable and programmable. As operation, management and control of the different types of storage media typically differ, the solid-state portion of a hybrid drive may include its own corresponding controller functionality, which may be integrated into a single controller along with the HDD functionality. A hybrid drive may be architected and configured to operate and to utilize the solid-state portion in a number of ways, such as, for non-limiting examples, by using the solid-state memory as cache memory, for storing frequently-accessed data, for storing I/O intensive data, and the like. Further, a hybrid drive may be architected and configured essentially as two storage devices in a single enclosure, i.e., a traditional HDD and an SSD, with either one or multiple interfaces for host connection.

Extensions and Alternatives

While embodiments, techniques and approaches are described herein throughout in the context of a dual-actuator system, it is contemplated and one can appreciate that these embodiments, techniques and approaches may be similarly applied to and implemented in multi-actuator systems, generally. That is, the number of actuators or actuator assemblies in a multi-actuator system in which the described embodiments, techniques and approaches may be implemented is not limited to two.

In the foregoing description, embodiments of the invention have been described with reference to numerous specific details that may vary from implementation to implementation. Therefore, various modifications and changes may be made thereto without departing from the broader spirit and scope of the embodiments. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

In addition, in this description certain process steps may be set forth in a particular order, and alphabetic and alphanumeric labels may be used to identify certain steps. Unless specifically stated in the description, embodiments are not necessarily limited to any particular order of carrying out such steps. In particular, the labels are used merely for convenient identification of steps, and are not intended to specify or require a particular order of carrying out such steps.

What is claimed is:

1. A data storage device comprising:
a first actuator assembly associated with a host-addressable first logical unit of memory and configured to operate on a corresponding first set of disk media surfaces;
a second actuator assembly associated with a host-addressable second logical unit of memory and configured to operate on a corresponding second set of disk media surfaces; and
an electronic controller communicatively coupled with the first actuator assembly and the second actuator assembly, the controller configured to:
receive, in association with the first logical unit of memory, a first request to start a repeating background process corresponding to the first logical unit of memory,
responsive to the first request, permit the start of the background process corresponding to the first logical unit of memory,
receive, in association with the second logical unit of memory, a second request to start the repeating background process corresponding to the second logical unit of memory, and
responsive to the second request, permit the start of the background process corresponding to the second logical unit of memory in response to determining the background process corresponding to the first logical unit of memory is complete or do not permit the start of the background process corresponding to the second logical unit of memory in response to determining the background process corresponding to the first logical unit of memory is not complete.

2. The data storage device of claim 1, wherein the controller is further configured to:
receive, in association with the first logical unit of memory, a notification that the background process corresponding to the first logical unit of memory is complete.

3. The data storage device of claim 1, wherein the controller is further configured to:
prior to responding to the second request, determine a status of the background process corresponding to the first logical unit of memory.

4. The data storage device of claim 1, wherein:
permitting the start of the background process corresponding to the first logical unit of memory includes permitting the start of the background process on only a first portion of the first logical unit of memory;
the controller is further configured to:
subsequent to permitting the start of the background process corresponding to the second logical unit of memory, receive in association with the first logical unit of memory a subsequent request to restart the background process corresponding to a second portion of the first logical unit of memory, and
responsive to the subsequent request, permit the restart of the background process corresponding to the second portion of the first logical unit of memory in response to determining the background process corresponding to the second logical unit of memory is complete or do not permit the restart of the background process corresponding to the second portion of the first logical unit of memory in response to determining the background process corresponding to the second logical unit of memory is not complete.

5. The data storage device of claim 4, wherein each of the first and second portions of the first logical unit of memory is a respective fixed block of physical memory corresponding to the first logical unit of memory.

6. The data storage device of claim 1, wherein:
the repeating background process corresponding to the first logical unit of memory is a background media scan of the first set of disk media surfaces; and
the repeating background process corresponding to the second logical unit of memory is a background media scan of the second set of disk media surfaces.

7. A controller circuitry for a multi-actuator hard disk drive, the controller circuitry storing or accessing one or more sequences of instructions which, when executed by one or more processors, cause performance of:
receiving, in association with a first logical unit of memory of the multi-actuator hard disk drive, a first request to start a repeating background process corresponding to the first logical unit of memory;
responsive to the first request, permitting the start of the background process corresponding to the first logical unit of memory;
receiving, in association with a second logical unit of memory of the multi-actuator hard disk drive, a second request to start the repeating background process corresponding to the second logical unit of memory; and
responsive to the second request, permitting the start of the background process corresponding to the second logical unit of memory in response to determining the background process corresponding to the first logical unit of memory is complete or not permitting the start of the background process corresponding to the second logical unit of memory in response to determining the background process corresponding to the first logical unit of memory is not complete.

8. The controller circuitry of claim 7, wherein the one or more sequences of instructions which, when executed by one or more processors, cause further performance of:
receiving, in association with the first logical unit of memory, a notification that the background process corresponding to the first logical unit of memory is complete.

9. The controller circuitry of claim 7, wherein the one or more sequences of instructions which, when executed by one or more processors, cause further performance of:
prior to responding to the second request, determining a status of the background process corresponding to the first logical unit of memory.

10. The controller circuitry of claim 7, wherein permitting the start of the background process corresponding to the first logical unit of memory includes permitting the start of the background process on only a first portion of the first logical unit of memory, and wherein the one or more sequences of instructions which, when executed by one or more processors, cause further performance of:
subsequent to permitting the start of the background process corresponding to the second logical unit of memory, receiving in association with the first logical unit of memory a subsequent request to restart the background process corresponding to a second portion of the first logical unit of memory; and
responsive to the subsequent request, permitting the restart of the background process corresponding to the second portion of the first logical unit of memory in response to determining the background process corresponding to the second logical unit of memory is complete or not permitting the restart of the background process corresponding to the second portion of the first logical unit of memory in response to determining the background process corresponding to the second logical unit of memory is not complete.

11. The controller circuitry of claim 10, wherein each of the first and second portions of the first logical unit of memory is a respective fixed block of physical memory corresponding to the first logical unit of memory.

12. A multi-actuator hard disk drive comprising the controller circuitry of claim 7, wherein:
the repeating background process corresponding to the first logical unit of memory is a background media scan of a first set of disk media surfaces serviced by a first actuator assembly; and
the repeating background process corresponding to the second logical unit of memory is a background media scan of a second set of disk media surfaces serviced by a second actuator assembly.

13. A method of controlling a hard disk drive multi-actuator system, the method comprising:
receiving, in association with a first logical unit of memory of the hard disk drive, a first request to start a repeating background process corresponding to the first logical unit of memory;
responsive to the first request, permitting the start of the background process corresponding to the first logical unit of memory;
receiving, in association with a second logical unit of memory of the hard disk drive, a second request to start the repeating background process corresponding to the second logical unit of memory; and
responsive to the second request, permitting the start of the background process corresponding to the second logical unit of memory in response to determining the background process corresponding to the first logical unit of memory is complete or not permitting the start of the background process corresponding to the second logical unit of memory in response to determining the background process corresponding to the first logical unit of memory is not complete.

14. The method of claim 13, further comprising:
receiving, in association with the first logical unit of memory, a notification that the background process corresponding to the first logical unit of memory is complete.

15. The method of claim 13, further comprising:
prior to responding to the second request, determining a status of the background process corresponding to the first logical unit of memory.

16. The method of claim 13, wherein permitting the start of the background process corresponding to the first logical unit of memory includes permitting the start of the background process on only a first portion of the first logical unit of memory, the method further comprising:
subsequent to permitting the start of the background process corresponding to the second logical unit of memory, receiving in association with the first logical unit of memory a subsequent request to restart the background process corresponding to a second portion of the first logical unit of memory; and
responsive to the subsequent request, permitting the restart of the background process corresponding to the second portion of the first logical unit of memory in response to determining the background process corresponding to the second logical unit of memory is complete or not permitting the restart of the background process corresponding to the second portion of the first logical unit of memory in response to determining the background process corresponding to the second logical unit of memory is not complete.

17. The method of claim 16, wherein each of the first and second portions of the first logical unit of memory is a respective fixed block of physical memory corresponding to the first logical unit of memory.

18. The method of claim 13, wherein:
the repeating background process corresponding to the first logical unit of memory is a background media scan of a first set of disk media surfaces serviced by a first actuator assembly of the multi-actuator system; and
the repeating background process corresponding to the second logical unit of memory is a background media scan of a second set of disk media surfaces serviced by a second actuator assembly of the multi-actuator system.

* * * * *